E. SEARS.
Bean and Pumpkin-Seed Dropper.

No. 166,638.

Patented Aug. 10, 1875.

WITNESSES
Henry N. Miller
C. L. Everitt

INVENTOR
Ephraim Sears
By Alexander Mason
Attorney

UNITED STATES PATENT OFFICE.

EPHRAIM SEARS, OF KIMBOLTON, OHIO.

IMPROVEMENT IN BEAN AND PUMPKIN-SEED DROPPERS.

Specification forming part of Letters Patent No. 166,638, dated August 10, 1875; application filed June 18, 1875.

*To all whom it may concern:*

Be it known that I, EPHRAIM SEARS, of Kimbolton, in the county of Guernsey and in the State of Ohio, have invented certain new and useful Improvements in Pumpkin and Bean Seed Dropper; and do hereby declare that the following is a full, clear, and exact description thereof, reference being had to the accompanying drawings and to the letters of reference marked thereon, making a part of this specification.

The nature of my invention consists in the construction and arrangement of a machine for dropping pumpkin-seed and beans, to be attached to a corn-planter, and operated by the same mechanism that operates the corn-planter, as will be hereinafter more fully set forth.

In order to enable others skilled in the art to which my invention appertains to make and use the same, I will now proceed to describe its construction and operation, referring to the annexed drawing, in which—

Figure 1:
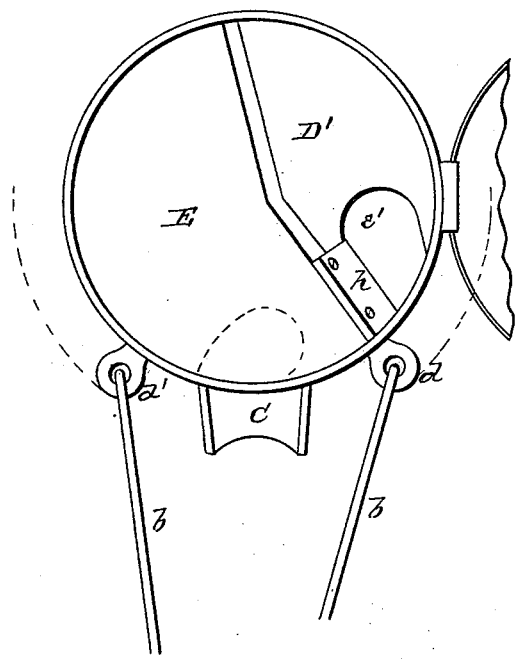
Figure 2:
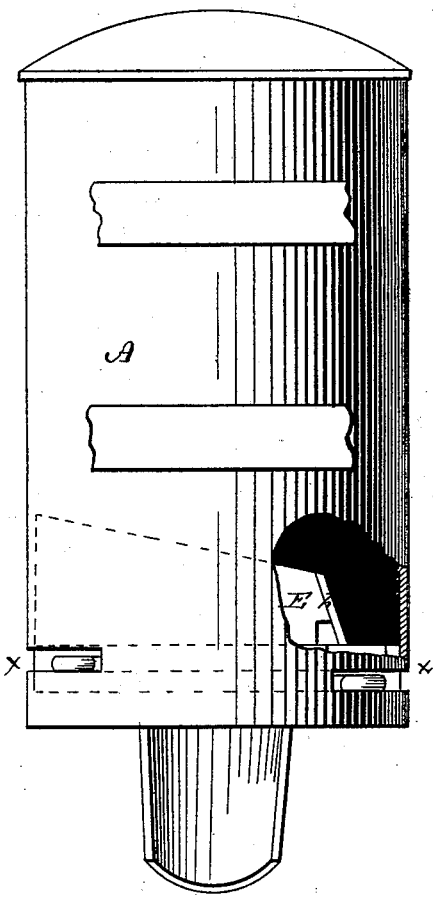
Figure 3:
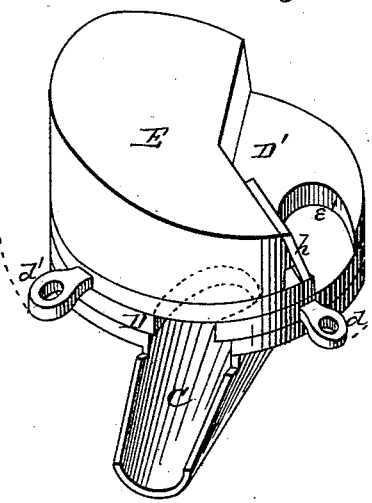
Figure 4:
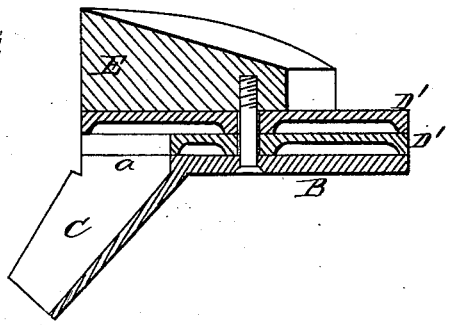

Figure 1 is a plan view of my invention. Fig. 2 is a side elevation of the same. Fig. 3 is a perspective view of the bottom of my dropper, and Fig. 4 is a longitudinal section of the same.

A represents a cylindrical case or vessel of any suitable dimensions to contain the seed to be dropped, and is to be attached in any suitable manner to a corn-planter, so as to be convenient for the corn-planting mechanism to operate the dropping mechanism in said cylinder. B is the bottom of the cylinder A, provided on one side with an aperture, $a$, and inclined spout C underneath, as shown. On top of the bottom B are placed two circular disks or plates, D D', pivoted centrally, as shown in Fig. 4, and formed on their under sides with central and circumferential flanges to reduce the friction. The disks D D' are provided, respectively, with ears or handles $d\ d'$, which project through slots $x\ x$ in the cylinder or case A, and are, by rods or wires $b\ b$, connected with the reciprocating part of the mechanism operating the corn-planter to which my dropper is attached. The disks are further, respectively, provided with apertures $e$ and $e'$, corresponding in shape and size with the aperture $a$ in the bottom B, and the disks are so arranged with their handles that said handles will be one on each side of the spout C, and be moved alternately to and from each other. Over the disks within the cylinder is a segmental block, E, made inclined on its upper surface, and provided with a flexible cut-off, $h$, all arranged as shown in the drawing.

The operation of the dropper is as follows: The corn-planter to which the dropper is attached being in operation the disks D D' are turned by throwing their handles outward away from each other. The aperture $e'$ in the top disk D', during this movement, carries the seed under and by the flexible cut-off $h$, and through the aperture $e$ of the lower disk D onto the bottom B. When the disks are then turned, so as to throw the handles toward each other, the lower disk D discharges the seed through the spout C, while the upper disk D' returns to receive more seed from the cylinder.

Having thus fully described my invention, what I claim as new, and desire to secure by Letters Patent, is—

1. In a seed-dropper, the combination of the disks D D', pivoted centrally one on top of the other, and provided with the apertures $e\ e'$, respectively, and operated simultaneously in opposite directions, substantially as and for the purposes herein set forth.

2. The combination of the case A, bottom B, with spout C, pivoted disks D D', having apertures $e\ e'$, and the segmental block E, provided with the flexible cut-off $h$, substantially as and for the purposes herein set forth.

In testimony that I claim the foregoing I have hereunto set my hand this 16th day of June, 1875.

EPHRAIM SEARS.

Witnesses:
 J. M. MASON,
 H. A. HALL.